United States Patent [19]

Willis

[11] 4,114,072

[45] Sep. 12, 1978

[54] HIGH VOLTAGE PROTECTION CIRCUIT HAVING PREDICTABLE FIRING POINT

[75] Inventor: Donald Henry Willis, Indianapolis, Ind.

[73] Assignee: RCA Corporation, New York, N.Y.

[21] Appl. No.: 819,187

[22] Filed: Jul. 26, 1977

[51] Int. Cl.² ............................................ H01J 29/70
[52] U.S. Cl. .................................... 315/411; 358/190
[58] Field of Search ....................... 315/379, 386, 411; 361/92, 100, 101; 358/190

[56] References Cited

U.S. PATENT DOCUMENTS

| | | | |
|---|---|---|---|
| 3,296,498 | 1/1967 | Chassanoff et al. | 317/148.5 |
| 3,475,653 | 10/1969 | Odenberg | 317/16 |
| 3,906,304 | 9/1975 | Willis | 315/379 |

Primary Examiner—Howard A. Birmiel
Assistant Examiner—T. M. Blum
Attorney, Agent, or Firm—Eugene M. Whitacre; Paul J. Rasmussen; Peter M. Emanuel

[57] ABSTRACT

A rectifying device, a switching device and a reference voltage device are coupled in parallel relationship between a winding of a transformer associated with the deflection circuitry of a television receiver and a filter capacitor of a power supply circuit for providing operating voltage to other portions of the receiver. The reference voltage device is also coupled to a control terminal of the switching device to control its conduction. Under normal conditions, the rectifying device is conductive in only one direction so that the filter capacitor is charged to a sufficient operating voltage to permit the normal operation of the receiver. The reference voltage device is selected so that if, under abnormal conditions, the difference between the voltage developed across the filter capacitor and the voltage developed across the transformer winding exceeds a level corresponding to an excessively high and therefore possibly harmful deflection voltage, the reference voltage device conducts a conduction control current to the control terminal of the switching device sufficient to render it conductive. Under these conditions, the development of sufficient voltage across the capacitor to support the normal operation of the receiver is inhibited and a viewer is effectively warned of the abnormal and potentially harmful condition.

6 Claims, 6 Drawing Figures

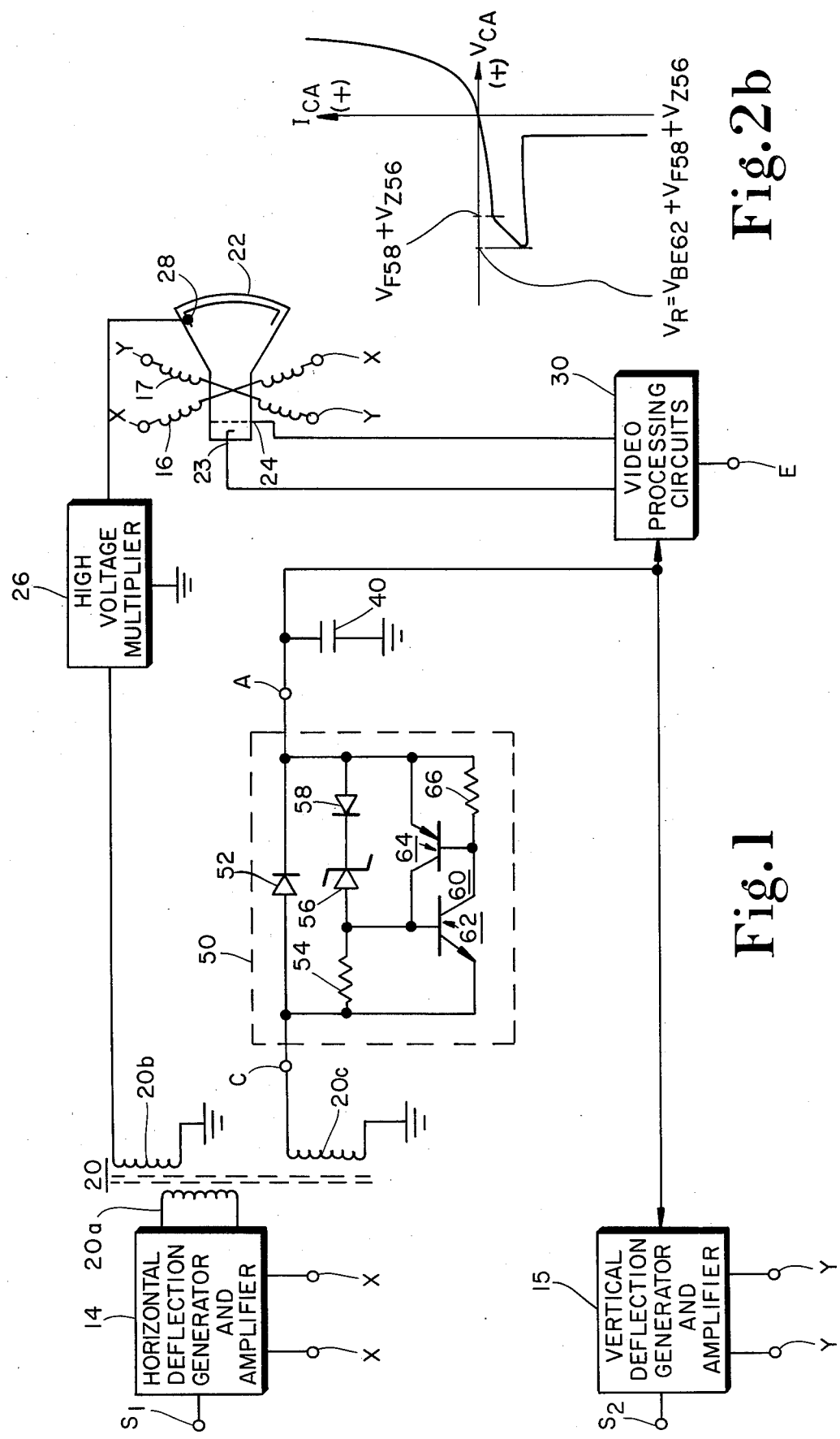

HIGH VOLTAGE PROTECTION CIRCUIT HAVING PREDICTABLE FIRING POINT

BACKGROUND OF THE INVENTION

The present invention pertains to protection circuits for high voltage circuitry of television receivers or the like.

In television receivers, the relatively high operating voltages for the electron beam accelerating electrodes of the picture tube are conventionally developed by arrangements utilizing a transformer winding associated with circuitry for generating signals to control the deflection of the electron beams produced by the picture tube. Some of these high voltage generating arrangements may tend to develop excessively high voltages under certain conditions such as the failure of components within the arrangement itself or the development of abnormally high voltages on the AC power input lines. Such excessively high voltages may lead to component failures elsewhere in the receiver and, in some instances, to the emission from the picture tube of potentially harmful X-radiation. Therefore, protection circuits have been employed to disable the normal operation of the receiver such as by rendering the display produced by the receiver unviewable to provide a warning to a viewer when excessively high and therefore potentially harmful voltages are generated by the high voltage generating arrangement of the receiver. Unfortunately, many of these protection circuits may be removed or bypassed or themselves may undergo component failures without affecting normal receiver operation and therefore may not effectively provide a warning when excessively high voltages are being generated by the receiver.

In U.S. Pat. No. 3,906,304 entitled, "High Voltage Protection Circuit", issued in the name of the same inventor as the present inventor, there is described a protection circuit which is intended not to affect receiver operation under normal conditions but to provide a warning to a user by rendering the picture produced by the receiver unviewable under abnormal conditions. Moreover, this protection circuit is arranged to provide protection when it has been removed or bypassed or when it suffers a component failure itself. Specifically, the protection circuit comprises a rectifying device, e.g., a diode, and a switching device, e.g., an SCR (Silicon Controlled Rectifier) with an unconnected gate electrode, coupled together in anti-parallel relationship to form an ITR (Integrated Thyristor Rectifier). The ITR is desirably coupled between a winding of a transformer associated with the deflection circuit of the receiver and a filter capacitor of a power supply circuit for display processing portions of the receiver. Under normal conditions, the rectifying device is conductive only in one direction to charge the filter capacitor to a supply voltage sufficient to permit the development of a viewable display. However, under abnormal conditions, if the difference between the voltage developed across the filter capacitor and the voltage developed across the transformer exceeds a level dependent on the characteristics of the switching device, the switching device is rendered conductive, thereby inhibiting the development of sufficient supply voltage across the filter capacitor to permit the development of a viewable picture. Ideally, the characteristics of the switching device are selected so that it is rendered conductive at a level corresponding to the generation of excessively high and therefore potentially harmful deflection voltages. Unfortunately, the voltage at which the switching device in this arrangement is rendered conductive is not predictable and has a tendency to change with environmental conditions. Therefore, a receiver employing such an arrangement may be unnecessarily disabled from operating normally at an acceptable voltage or may be permitted to operated beyond the voltage at which harmful X-radiation is likely to be produced.

While numerous circuits are known (see, for example, U.S. Pat. No. 3,475,653 issued in the name of Odenberg et al.) which employ a reference voltage device coupled to a device having an SCR characteristic for controlling its conduction or firing point, none of these arrangements have structure which would enable them to be used in a power supply circuit to charge a filter capacitor to a supply voltage from a source of alternating voltage under normal conditions and to inhibit the development of the supply voltage under conditions of excessively high and potentially harmful alternating voltage with the additional feature of providing protection even when purposely tampered with.

SUMMARY OF THE INVENTION

The present protection circuit includes a rectification means and a switching means coupled in parallel relationship between first and second terminals and a reference voltage device means coupled between a control terminal of the switching means and the second terminal. The first terminal is coupled to a source of alternating voltage and the second terminal is coupled to a filter capacitor of a power supply circuit. The rectification device is poled to conduct current between the first terminal and the second terminal to charge the filter capacitor. When the voltage between the second and first terminals exceeds a reference voltage determined by the conduction characteristics of the reference voltage means, the reference voltage means conducts a control current to the control terminal of the switching means of a sufficient magnitude to render the switching means conductive. The protection circuit may be desirably coupled between the deflection circuitry of a television receiver and a filter capacitor of a power supply circuit for developing operating voltage for other portions of the receiver. The voltage at which the present protection circuit is effective to inhibit the development of supply voltage across the filter capacitor required for normal operation of the receiver is not dependent on the conduction voltage of the switching means itself, which, if, for example, is of an SCR device with an unconnected gate electrode such as is utilized in the arrangement disclosed in U.S. Pat. No. 3,906,304 referred to above, tends to be relatively unpredictable and tends to change in response to environmental conditions, but is rather determined by the conduction voltage of the reference voltage means, which, if, for example, is of a Zener diode tends to be relatively predictable and stable.

BRIEF DESCRIPTION OF THE DRAWING

FIG. 1 shows, partially in block diagram form and partially in schematic form, an embodiment of the present protection circuit employed in a television receiver;

FIGS. 2a and 2b show graphical representations of the voltage versus current characteristics of the protection circuit shown in FIG. 1.

DETAILED DESCRIPTION OF THE DRAWING

Figure 2A:
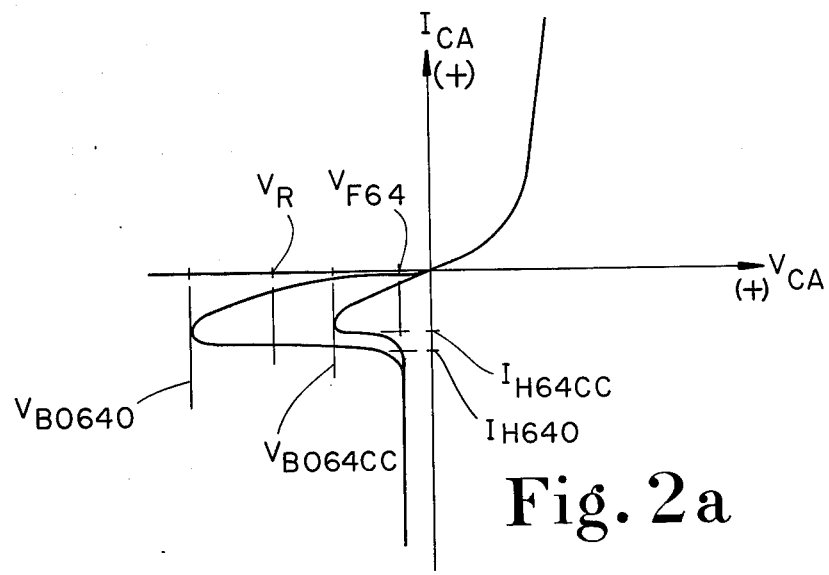

In the television receiver arrangement shown in FIG. 1, a horizontal deflection synchronizing signal coupled to a terminal $S_1$ synchronizes the operation of a horizontal deflection generator and amplifier 14. Deflection generator and amplifier 14 produces horizontal deflection current which is coupled through a pair of terminals X—X to a pair of horizontal deflection windings 16 disposed around a kinescope 22. Deflection generator and amplifier 14 also is coupled to a primary winding 20a of a horizontal output transformer 20. A high voltage winding 20b of horizontal output transformer 20 is coupled between an input terminal of a high voltage multiplier 26 and ground. An output terminal of high voltage multiplier 26 is coupled to a high voltage anode electrode terminal 28 of kinescope 22. High accelerating potential is supplied to kinescope 22. Voltage variations appearing across winding 20b in response to current flow in winding 20a are rectified and multiplied by high voltage multiplier 26.

Vertical deflection sync signals coupled to a terminal $S_2$ synchronize the operation of a vertical deflection generator and amplifier 15. Vertical deflection generator and amplifier 15 supplies vertical deflection current through a pair of terminals Y—Y to a pair of vertical deflection windings 17 disposed around kinescope 22.

Video signals are coupled to an input terminal E of video processing circuits 30. The output terminals of video processing circuits 30 are coupled to one or more control grids represented by a grid 24 and one or more cathodes represented by a cathode 23 of kinescope 22. Video processing circuits 30 may include such circuits as video amplification stages and chrominance circuitry. Circuits 30 function to provide control voltages to cathode 23 and grid 24 so that they may produce a viewable display on kinescope 22 when properly synchronized vertical and horizontal deflection currents flow through windings 17 and 16, respectively.

Voltage variations developed across an auxiliary winding 20c of horizontal output transformer 20 coupled between a terminal C and ground under normal operating conditions are rectified by a diode 52 of a protection circuit 50 and filtered by a filter capacitor 40 coupled between a terminal A and ground to provide direct current operating voltage for circuits such as video processing circuits 30 and vertical deflection generator and amplifier 15. If the voltage provided to auxiliary winding 20c by horizontal deflection generator and amplifier 14 should exceed a predetermined design limit, due, for example, to a component failure within horizontal deflection generator and amplifier 14 or the development of abnormally high voltage across the power lines of the receiver, protection circuit 50 inhibits the development of sufficient direct current operating voltage across filter capacitor 40 to permit the normal operation of video processing circuits 30 and vertical deflection generator and amplifier 15 and, as a result, the display produced by kinescope 22 is rendered unviewable. The design limit is desirably selected below a level corresponding to the magnitude of high accelerating potential developed by high voltage multiplier 26 which is likely to support the development of potentially harmful X-radiation.

Protection circuit 50 includes a diode poled to conduct current from terminal C to terminal A when the voltage developed at terminal C exceeds the voltage at terminal A. Protection circuit 50 also includes an NPN transistor 62 and a PNP transistor 64 arranged in a configuration 60 with the base of one connected to the collector of the other and the emitter of NPN transistor 62 connected to terminal C and the emitter of PNP transistor 64 coupled to terminal A. Configuration 60 of NPN transistor 62 and PNP transistor 64 functions in a manner quite similar to that of a silicon controlled rectifier (SCR) and may therefore be considered an SCR equivalent (see, for example, U.S. Pat. No. 3,619,658). A diode 58, a Zener diode 56 and a resistor 54 are coupled between terminal A and terminal C. Diode 58 and Zener diode 56 are poled to conduct current from terminal A to terminal C when rendered conductive. The anode of Zener diode 56 is coupled to a conduction control terminal of SCR configuration 60 at the base of NPN transistor 62 to control the conduction of SCR configuration 60 in the manner set forth below. A resistor is coupled between the emitter and base of PNP transistor 64 for the purpose set forth below.

The composite current ($I_{CA}$) versus voltage ($V_{CA}$) characteristics of the combination of diode 52 and SCR configuration 60 is shown in FIG. 2a. In FIG. 2a, positive voltages between terminals C and A are found to the right of the $I_{CA}$ ordinate axis and positive currents, that is, currents flowing from terminal C to terminal A are found above the $V_{CA}$ abscissa axis. The portion of the characteristic in the upper right quadrant is due to the forward biased characteristic (i.e., when the voltage at terminal C exceeds the voltage at terminal A) of diode 52. The portion of the characteristic in the lower left quadrant is due to the forward biased (i.e., when the voltage at terminal A exceeds the voltage at terminal C) characteristic of SCR configuration 60. With reference to the characteristic in the lower left quadrant, normally SCR configuration 60 is in a nonconductive or "OFF" state with only an insignificantly small amount of current flowing through it. Assuming for the moment that its control terminal is left unconnected (i.e., the anode of Zener diode 56 is not connected to the base of NPN transistor 62) as it is suggested in my aforementioned U.S. patent, SCR configuration 60 will remain in the nonconductive state until the voltage at terminal A exceeds the voltage at terminal C by an amount $V_{BO64O}$ (i.e., breakover voltage of SCR configuration 60 with its control terminal left unconnected). At this point, SCR configuration 60 switches in an avalanche fashion to a conductive or "ON" state. In the conductive state, a forward voltage VF64 is developed across it and a relatively large amount of current is able to flow through it. SCR configuration 60 remains in the conductive state, enabling current to flow through it, until the magnitude of the current flowing through it falls below a holding current $I_{H64O}$. At this point, SCR configuration 60 switches to its nonconductive state.

Thus, assuming that the conduction control terminal of SCR configuration 60 is unconnected, when the supply voltage developed across capacitor 40 exceeds the voltage developed across auxiliary winding 20c by an amount at least equal to the $V_{BO64O}$, SCR configuration 60 is rendered conductive. As a result, rectifying diode 52 will be bypassed and insufficient direct current supply voltage will be developed across capacitor 40 to maintain the normal operation of video processing circuit 30 and vertical deflection generator and amplifier 15 to produce a viewable display. Ideally then, if the conduction control terminal is left unconnected, $V_{BO64O}$ is chosen just below a design limit on the voltage difference between terminals A and C which corresponds to an excessively high and potentially harmful horizontal deflection voltage. Unfortunately, the breakover voltage of an SCR configuration in which the conduction control terminal or gate electrode (as the conduction control terminal of an SCR configuration is most often referred to) is left unconnected is relatively unpredictable and tends to change with environmental conditions. As a result, if the conduction control terminal of SCR configuration 60 was left unconnected, protection circuit 50 could render the display unviewable after the generation of an excessively high and potentially harmful horizontal deflection voltage or before such action was necessary when the magnitude of the horizontal deflection voltage was still acceptable.

However, because in the present protection circuit 50 the conduction control terminal of SCR configuration 60 at the base of transistor 62 is coupled to Zener diode 56, a predictable and consistent voltage reference, $V_R$, determines the point at which SCR configuration 60 is rendered conductive. Specifically, in the arrangement of FIG. 1, $$V_R = V_{F58} + V_{Z56} + V_{BE62} \tag{1}$$

where $V_{F58}$ is the voltage developed between the anode and the cathode of diode 58 when it is rendered conductive in the forward direction;

$V_{Z56}$ is the voltage developed between the cathode and anode of Zener diode 56 when it is rendered conductive in the reverse direction; and $V_{BE62}$ is the voltage developed between the base and the emitter of NPN transistor 62 when its base-emitter junction is rendered conductive in the forward direction.

Expression (1) may be understood with reference to the current versus voltage characteristic in FIG. 2b. As in FIG. 2a, in the upper right quadrant where the voltage at terminal C exceeds the voltage at terminal A, diode 52 is conductive and exhibits a forward-biased diode characteristic. In the lower quadrant, where the voltage at terminal A exceeds the voltage at terminal C, diode 52 is rendered nonconductive and the current flowing between terminals C and A in either direction remains small until the sum of $V_{F58}$ and $V_{Z56}$ is exceeded. When this occurs, current flows from terminal A to terminal C through diode 58, Zener diode 56 and resistor 54. When sufficient current flows through resistor 54 so that $V_{BE62}$ is exceeded, NPN transistor 62 is rendered conductive between its collector and its emitter junction. As a result, current flows through resistor 66 and sufficient voltage is developed across resistor 66 to render PNP transistor 64 conductive. Thereafter, a regenerative action takes place between transistors 62 and 64 completing the SCR type avalanche characteristic in the lower left quadrant. The voltage $V_{F58}$, $V_{Z56}$ and $V_{BE62}$ are relatively predictable and stable compared to the breakover voltage of an SCR configuration and thereby the disadvantages set forth above are obviated.

The above-mentioned operation may also be understood in terms of the characteristic shown in FIG. 2a. When the voltage between terminal A and terminal C is exceeded and diodes 56 and 58 are rendered conductive, a conduction control current is conducted to the conduction control terminal of SCR configuration 60 which biases SCR configuration 60 so that it has a breakover voltage $V_{BO64CC}$ less than the reference voltage $V_R$. Since, at this point, the voltage between terminals A and C is greater than $V_{BO64CC}$, SCR configuration 60 is rendered conductive. As long as the current flowing through SCR configuration 60 exceeds the holding current $I_{H64CC}$, SCR configuration 60 will remain conductive even though the voltage between terminal A and terminal C falls below the breakover voltage $V_{BO64CC}$.

Resistor 54 has a value selected so that when the voltage between terminal A and terminal C exceeds $V_{F58} + V_{Z56}$, the current flowing through Zener diode 56 biases it at a point in its reverse bias avalanche region where the voltage developed across it between the cathode and anode is relatively unaffected by the magnitude of the current flowing through it. Diode 58 is poled to inhibit current from flowing through Zener diode 56 in the forward direction, i.e., between its anode and its cathode, when the voltage at terminal C exceeds the voltage at terminal A. This is desirable because it inhibits the accumulation of charge in the junction region of Zener diode 56 which has to be removed before Zener diode 56 can be rendered conductive in the reverse direction. Thus, diode 58 serves to reduce the time required to switch Zener diode 56 from its nonconductive state to its conductive state. This is a desirable feature of the present protection circuit since during conditions when excessively large voltages are developed at terminal C, Zener diode 56 may have to switch between its "OFF" and "ON" states at a relatively high frequency, i.e., the frequency of the occurrence of the horizontal flyback pulse (as will be explained with reference to FIGS. 3a-3a).

Resistor 66 is selected sufficiently low in value so that any leakage current flowing through the collector-emitter junction of NPN transistor 62 when SCR configuration 60 is nonconductive will flow through resistor 66 rather than through the base-emitter junction of PNP transistor 64. Otherwise, transistor 64, and then in turn transistor 62, may undesirably exhibit a tendency to be rendered conductive before the voltage between terminals A and C has exceeded $V_R$. Similarly, the value of resistor 54 should desirably be selected low enough so that it inhibits leakage current flowing through the collector-emitter junction of transistor 64 from flowing through the base-emitter junction of transistor 62.

Figure 3A:
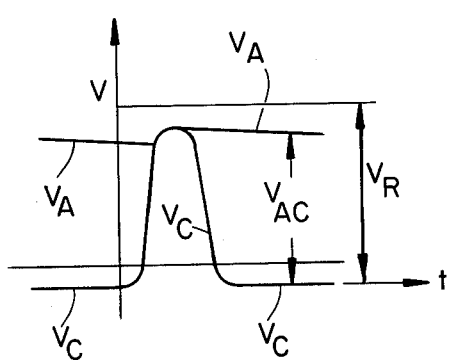
FIGS. 3a–3c show graphical representations of voltage waveforms associated with the protection circuit of FIG. 1.
Figure 3B:
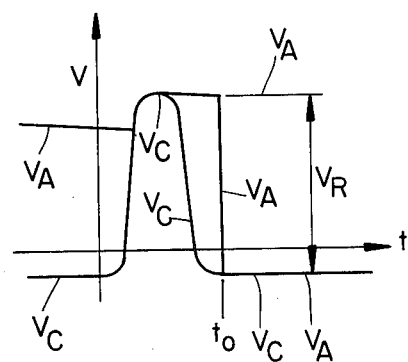
Figure 3C:
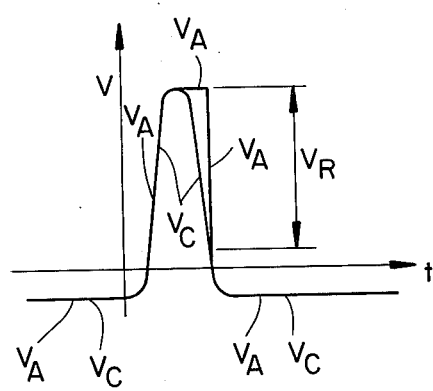

Although the operation of protection circuit 50 within the receiver arrangement of FIG. 1 has already been referred to during the description of its operating characteristics, reference to the voltage waveforms of FIGS. 3a, 3b and 3c will facilitate its further understanding. As a horizontal deflection flyback pulse is developed across the horizontal output transformer primary winding 20a, a similar voltage pulse, $V_C$ of FIG. 3a, is developed across auxiliary supply winding 20c. This voltage pulse is rectified by diode 52 and stored in capacitor 40. The voltage developed across capacitor 40 is illustrated by the waveform $V_A$ of FIG. 3a. As direct operating current is provided to video processing circuits 30 and vertical deflection generator and amplifier 15, capacitor 40 is discharged and $V_A$ decreases. When the next succeeding flyback pulse appears across windings 20a and 20c and is rectified by diode 52, capacitor 40 again charges.

As FIG. 3a indicates, during normal operation of horizontal deflection generator and amplifier 14, the difference $V_{AC}$ between $V_C$ and $V_A$ does not exceed $V_R$.

Since the voltage generated across winding 20c and hence the voltage between terminals A and C is directly related to the voltage generated across windings 20a and 20b, the conduction state of SCR configuration 60 provides an indication of when the voltage developed across winding 20b exceeds normal operating limits.

As earlier stated, the reference voltage $V_R$ is selected so that when an excessively high voltage is developed across winding 20b, the difference between $V_A$ and $V_C$ will reach $V_R$ and SCR configuration 60 will be placed in the highly conductive state as indicated at time $t_0$ of FIG. 3b. As a result, $V_A$ will be reduced to some low level, disrupting the supply of direct operating current to video processing circuits 30 and to vertical deflection generator and amplifier 15. The kinescope display will thereby be rendered unviewable, giving an indication to the viewer of a high voltage generator malfunction in the receiver requiring attention.

FIG. 3c is an illustration of the voltage waveforms at terminals A and C of FIG. 1 in the situation in which excessive voltage continues to be developed across winding 20b and similarly across winding 20c in successive horizontal deflection cycles after the voltage $V_R$ has initially been reached as illustrated in FIG. 3b assuming that the current through SCR configuration 60 falls below $I_{H64CC}$ causing SCR configuration 60 to be rendered nonconductive during the horizontal scanning intervals between the horizontal flyback pulses. As is shown, $V_A$ remains equal to $V_C$ during the horizontal scanning intervals and increases, by virtue of the conduction of diode 52, as $V_C$ rises. When the difference between $V_A$ and $V_C$ again exceeds $V_R$, $V_A$ again falls to $V_C$. If SCR configuration 60 is a slow switching type, it may not switch into the nonconductive state between flyback pulses $V_C$. In this situation, $V_A$ will by approximately $V_C$ from the time the overvoltage condition first appears. It may be seen that whether or not SCR configuration 60 switches to the nonconductive state during the scanning interval, the kinescope display will remain unviewable in either situation until the condition resulting in excessive voltage across windings 20b and 20c is corrected.

Because protection circuit 50 is connected in series with capacitor 40, if the excessively high voltage across windings 20b and 20c is due to a temporary condition, for example, abnormally high power line voltage, protection circuit 50 will be automatically reset to its normal condition wherein SCR configuration 60 is rendered nonconductive after the power line voltage returns to its normal level. This is so because the current through SCR configuration 60 will fall below holding current $I_{H64CC}$. If protection circuit 50 were coupled in shunt with capacitor 40 once it was rendered conductive, the current through it could quite possibly not fall below its holding current and additional resetting circuitry would be required. Moreover, if protection circuit 50 were connected in shunt with capacitor 40, it could not serve to provide rectified voltage to capacitor 40 without additional circuitry.

Protection circuit 50 is desirably constructed as a two terminal integrated circuit, so that it is difficult for a user to tamper with it thereby disabling its protective features. If a user attempts to either short circuit it or remove it from the receiver, insufficient rectified voltage will be provided to permit the normal operation of video processing circuits 30 and vertical deflection generator and amplifier 15. Furthermore, it is desirable for the separate devices within a two terminal integrated circuit comprising protection circuit 50 to share common junction areas so that if one device suffered from an open or short circuit malfunction, the others did likewise. With this provision, when a malfunction occurs within protection circuit 50, insufficient rectified voltage will be provided to permit the normal operation of units 30 and 15.

Typical circuit values for the successful operation of protection device 50 when utilized in a television receiver employing a CTC-68 chassis manufactured by RCA Corporation and described in "Color Television Service Data File 1974 C-5 S2" published by RCA Corporation are listed below:

Zener diode 56; 33 volt Zener diode
resistor 54; 330 ohm resistor
resistor 66; 330 ohm resistor

What is claimed is:

1. In a television receiver including a kinescope for generating at least one electron beam, deflection means for generating horizontal and vertical deflection signals for controlling the deflection of said electron beam, high voltage means for generating a relatively high operating potential in response to said horizontal deflection signals, and video processing means for controlling the modulation of said electron beam to provide a display, apparatus comprising:
   a transformer winding coupled to said deflection means for developing an alternating voltage in response to said horizontal deflecton signal;
   supply voltage means including at least a filter capacitor for developing a supply voltage for said deflection means and said video processing means; and
   an integrated circuit device having a first terminal coupled to said transformer winding and a second terminal coupled to said filter capacitor, said integrated circuit device including rectifying means coupled between said first terminal and said second terminal for charging said filter capacitor in response to said alternating voltage so that said supply voltage has a sufficient amplitude for a viewable display;
   switching means exhibiting the conduction characteristics of a silicon controlled rectifier coupled between said first terminal and said second terminal, said switching means including a control electrode for controlling the conduction thereof, said switching means being normally nonconductive; and
   voltage reference means including a Zener diode and a diode coupled in series relationship between said first terminal and said second terminal, said Zener diode and said diode also being directly connected in series between said second terminal and said control electrode of said switching means, said voltage reference means being normally nonconductive, said voltage reference means being rendered conductive and thereby coupling a conduction control current to said switching means to render it conductive in turn when the difference between said supply voltage and said alternating voltage exceeds a predetermined voltage, said diode being poled to inhibit the flow of current through said Zener diode except when said supply voltage exceeds said alternating voltage by said predetermined voltage, said predetermined voltage corresponding to the level of said relatively high operating potential for said kinescope at which the generation of potentially harmful X-radiation is likely, the amplitude of said supply voltage falling to a level at which the display is unviewable when said switching means is conductive.

2. The apparatus recited in claim 1 wherein said switching means includes first and second transistors of opposite conduction type each having a base, a collector and an emitter, the emitter of said first transistor being coupled to said first terminal, the emitter of said second transistor being coupled to said second terminal, the base of said first transistor being coupled to the collector of said second transistor, and the collector of said first transistor being coupled to the base of said second transistor.

3. The apparatus recited in claim 2 wherein said Zener diode and said diode are directly connected in series between said second terminal and the base of said first transistor.

4. The apparatus recited in claim 3 wherein a first element exhibiting electrical resistance to DC current is coupled between said first terminal and the base of said first transistor.

5. The apparatus recited in claim 4 wherein a second element exhibiting DC electrical resistance to DC current is coupled between said second terminal and the base of said second transistor.

6. The apparatus recited in claim 5 wherein said first transistor has a propensity to conduct a first leakage current between the collector and the base thereof; said second transistor has a propensity to conduct a second leakage current between the collector and the base thereof; said first element is a first resistor having a resistance value sufficiently small to divert said first leakage current from the base of said first transistor; and said second element is a second resistor having a resistance value sufficiently small to divert said second leakage current from the base of said second transistor.

* * * * *

UNITED STATES PATENT OFFICE
CERTIFICATE OF CORRECTION

PATENT NO. : 4,114,072

DATED : September 12, 1978

INVENTOR(S) : Donald Henry Willis

It is certified that error appears in the above-identified patent and that said Letters Patent are hereby corrected as shown below:

Column 5, line 43, that portion reading "lower quadrant" should read -- lower left quadrant --; line 62, that portion reading "above-mentioned" should read -- above-described --; Column 6, line 34, that portion reading "3a-3a" should read -- 3a-3c --.

Signed and Sealed this

Twelfth Day of December 1978

[SEAL]

Attest:

RUTH C. MASON
Attesting Officer

DONALD W. BANNER
Commissioner of Patents and Trademarks